United States Patent
Hsu et al.

(10) Patent No.: US 10,390,547 B2
(45) Date of Patent: Aug. 27, 2019

(54) HARD CANDY WITH REDUCED SUGAR

(75) Inventors: Chia-Hua Hsu, Glenview, IL (US); David G. Barkalow, Deerfield, IL (US); Barbara Stawski, Forest Park, IL (US)

(73) Assignee: WM. WRIGLEY JR. COMPANY, Chicago, IL (US)

( * ) Notice: Subject to any disclaimer, the term of this patent is extended or adjusted under 35 U.S.C. 154(b) by 543 days.

(21) Appl. No.: 13/976,518

(22) PCT Filed: Dec. 27, 2011

(86) PCT No.: PCT/US2011/067361
§ 371 (c)(1),
(2), (4) Date: Aug. 8, 2013

(87) PCT Pub. No.: WO2012/092255
PCT Pub. Date: Jul. 5, 2012

(65) Prior Publication Data
US 2013/0309382 A1  Nov. 21, 2013

Related U.S. Application Data

(60) Provisional application No. 61/428,303, filed on Dec. 30, 2010.

(51) Int. Cl.
*A23G 3/42*  (2006.01)

(52) U.S. Cl.
CPC ............ *A23G 3/42* (2013.01); *A23G 2200/06* (2013.01); *A23V 2002/00* (2013.01); *A23V 2250/282* (2013.01); *A23V 2250/62* (2013.01)

(58) Field of Classification Search
CPC .... A23G 3/42; A23G 3/36; A23G 3/38; A23L 2/60; A23L 1/2363; A23L 1/2364; A23L 1/095; A23L 1/097; A23L 1/308; A23L 1/3088
USPC ........................................ 426/548, 658, 660
See application file for complete search history.

(56) References Cited

U.S. PATENT DOCUMENTS

| | | | |
|---|---|---|---|
| 4,786,722 A | 11/1988 | Zehner | |
| 4,883,685 A * | 11/1989 | Kondou | A23G 3/0252 426/548 |
| 4,902,525 A | 2/1990 | Kondou | |
| 5,236,719 A | 8/1993 | Meyers et al. | |
| 5,244,690 A | 9/1993 | Van der Schueren et al. | |
| 5,273,771 A | 12/1993 | Rapaille et al. | |
| 5,286,501 A | 2/1994 | Song et al. | |
| 5,314,701 A | 5/1994 | Mentick et al. | |
| 5,342,631 A | 8/1994 | Yatka et al. | |
| 5,356,644 A | 10/1994 | Hendrick et al. | |
| 5,378,481 A | 1/1995 | Minamikawa et al. | |
| 5,397,579 A | 3/1995 | Yatka et al. | |
| 5,409,726 A | 4/1995 | Stanley et al. | |
| 5,425,957 A | 6/1995 | Gaim-Marsoner et al. | |
| 5,425,961 A | 6/1995 | Yatka et al. | |
| 5,431,929 A | 7/1995 | Yatka et al. | |
| 5,436,329 A | 7/1995 | Caboche | |
| 5,458,892 A | 10/1995 | Yatka et al. | |
| 5,462,760 A | 10/1995 | Serpelioni et al. | |
| 5,468,509 A | 11/1995 | Schlup et al. | |
| 5,478,593 A | 12/1995 | Serpelioni et al. | |
| 5,567,467 A | 10/1996 | Kondou et al. | |
| 5,571,547 A | 11/1996 | Serpelioni et al. | |
| 5,601,866 A | 2/1997 | Serpelloni et al. | |
| 5,629,042 A | 5/1997 | Serpelloni et al. | |
| 5,667,573 A | 9/1997 | Kondou | |
| 5,681,601 A | 10/1997 | Hendrick et al. | |
| 5,700,514 A | 12/1997 | Gonze et al. | |
| 5,795,590 A | 8/1998 | Kiefer et al. | |
| 5,916,881 A | 6/1999 | Okada et al. | |
| 5,973,212 A | 10/1999 | De Sadeleer et al. | |
| 5,998,177 A * | 12/1999 | Catani et al. ............... 435/101 | |
| 6,017,567 A | 1/2000 | Rosenplenter | |
| 6,045,850 A | 4/2000 | Kondou | |
| 6,083,438 A | 7/2000 | Gonze et al. | |
| 6,143,345 A | 11/2000 | Gonze et al. | |
| 6,177,064 B1 | 1/2001 | Troostembergh et al. | |
| 6,187,336 B1 | 2/2001 | Okumura et al. | |
| 6,238,690 B1 | 5/2001 | Kiefer et al. | |
| 6,264,989 B1 | 7/2001 | Kato et al. | |
| 6,274,727 B1 | 8/2001 | Maul et al. | |
| 6,287,596 B1 | 9/2001 | Murakami et al. | |
| 6,447,821 B1 | 9/2002 | Hakamata et al. | |
| 6,455,090 B1 | 9/2002 | Uzuhashi et al. | |

(Continued)

FOREIGN PATENT DOCUMENTS

| | | |
|---|---|---|
| EP | 00123742 A1 | 11/1984 |
| EP | 0377278 A2 | 7/1990 |

(Continued)

OTHER PUBLICATIONS foodnavigator.com "Xtend™ Sucromalt and Isomaltulose" (Feb. 28, 2007) 4 pages.*
"Inulin-A Good-for-you" Fat Replacer, Texture Modifier; Food Formulating—Feb. 1997—R&D Technologies—1 page.*
Peter Cheetham (Production of isomaltulose—Methods in Enzymology vol. 136 pp. 432-454—Published in 1987 Academic Press Inc.*
U.S. Food and Drug Administration, Evaluation of the Generally Recognized as Safe (GRAS) Status of Sucromalt, Cargill, Incorporated, Sep. 8, 2008, GRN No. 258, retrieved on Mar. 18, 2015, http://www.accessdata.fda.gov/scripts/fdcc/?set=GRASNotices&id=258&sort=GRN_No&order=DESC&startrow=1&type=basic&search=sucromalt.

(Continued)

*Primary Examiner* — Jyoti Chawla

(57) ABSTRACT

A low cariogenic, low-laxation hard candy product having acceptable clarity and cold flow stability, contains a bulking sweetener agent, comprising isomaltulose, trehalose, erythritol or combinations thereof and a doctoring agent, comprising inulin, indigestible dextrin, sucromalt, polydextrose, or combinations thereof; wherein the bulking sweetener agent to doctoring agent ratio is 70/30 to 40/60 dry solids wt. %.

10 Claims, No Drawings

(56) References Cited

U.S. PATENT DOCUMENTS

| | | | |
|---|---|---|---|
| 6,455,096 B1* | 9/2002 | Katagiri et al. | 426/660 |
| 6,506,434 B1 | 1/2003 | Toub et al. | |
| 6,511,679 B2 | 1/2003 | D'Amelia et al. | |
| 6,620,791 B1 | 9/2003 | Cooper et al. | |
| 6,743,456 B1 | 6/2004 | Ribadeau-Dumas et al. | |
| 6,767,576 B2 | 7/2004 | Serpelioni | |
| 6,773,744 B1 | 8/2004 | Ward et al. | |
| 6,780,990 B1 | 8/2004 | Le | |
| 6,783,779 B2 | 8/2004 | Rapp et al. | |
| 6,875,460 B2 | 4/2005 | Cunningham et al. | |
| 6,994,889 B2 | 2/2006 | Satomi et al. | |
| 7,022,364 B1 | 4/2006 | De Meuter et al. | |
| 7,063,858 B2 | 6/2006 | Saniez et al. | |
| 7,108,886 B2 | 9/2006 | De Meuter et al. | |
| 8,512,739 B2 | 8/2013 | Carlson et al. | |
| 2003/0077369 A1* | 4/2003 | Jager et al. | 426/548 |
| 2004/0086615 A1 | 5/2004 | Johnson et al. | |
| 2004/0110442 A1 | 6/2004 | Rhim et al. | |
| 2006/0051480 A1 | 3/2006 | Miles | |
| 2006/0172053 A1 | 8/2006 | Hahn et al. | |
| 2006/0222754 A1* | 10/2006 | Singer | 426/660 |
| 2007/0212460 A1 | 9/2007 | Inoue et al. | |
| 2007/0224323 A1* | 9/2007 | Goldman | 426/548 |
| 2009/0004360 A1 | 1/2009 | Bingley et al. | |
| 2009/0074917 A2 | 3/2009 | Steele et al. | |
| 2010/0104722 A1 | 4/2010 | Francisca et al. | |
| 2010/0112142 A1 | 5/2010 | Barkalow et al. | |
| 2010/0119664 A1 | 5/2010 | Stawski | |
| 2010/0203190 A1 | 8/2010 | Barkawlow et al. | |
| 2010/0267658 A1 | 10/2010 | Wach et al. | |
| 2001/1009159 | 4/2011 | Hsu et al. | |
| 2011/0091598 A1 | 4/2011 | Hsu et al. | |
| 2011/0129563 A1 | 6/2011 | Ashokan et al. | |
| 2011/0313055 A1 | 12/2011 | Ervin et al. | |

FOREIGN PATENT DOCUMENTS

| | | | | |
|---|---|---|---|---|
| EP | 0676147 | A1 | 10/1995 | |
| EP | 0720819 | A2 | 7/1996 | |
| EP | 1797768 | A2 | 6/2007 | |
| GB | 2066639 | A * | 7/1981 | ............ A21D 2/181 |
| WO | 1992002149 | A1 | 2/1992 | |
| WO | 1993012665 | A1 | 7/1993 | |
| WO | 2001019204 | A1 | 3/2001 | |
| WO | WO2001019203 | | 3/2001 | |
| WO | WO2004040991 | | 5/2004 | |
| WO | 2008055510 | A1 | 5/2008 | |
| WO | 2008100851 | A1 | 8/2008 | |
| WO | 2008100853 | A1 | 8/2008 | |
| WO | 2008100854 | A1 | 8/2008 | |
| WO | 2008102162 | A1 | 8/2008 | |
| WO | WO 2008141333 | A1 * | 11/2008 | ........... A21D 13/062 |
| WO | 2009124067 | A1 | 10/2009 | |
| WO | WO2010031257 | | 3/2010 | |
| WO | 2011038882 | A1 | 4/2011 | |
| WO | 2011107234 | A1 | 9/2011 | |
| WO | WO2011107234 | | 9/2011 | |
| WO | 2012006215 | A1 | 1/2012 | |

OTHER PUBLICATIONS

Casterton et al., "Evaluation of sucromalt digestion in healthy children using breath hydrogen as a biomarker of carbohydrate malabsorption," Food and Function, 3(4): 410-413 (2011).

U.S. Food and Drug Administration, Evaluation of the Generally Recognized as Safe (GRAS) Status of Sucromalt, Cargill, Incorporated, Sep. 8, 2008, GRN No. 258, retrieved on Dec. 13, 2016, http://www.accessdata.fda.gov/scripts/fdoc/?set=GRASNotices&id=258.

International Search Report and Written Opinion for Application No. PCT/US2011/67361, dated Apr. 27, 2012, 14 pages.

International Search Report and Written Opinion for Application No. PCT/U52013/20723, dated May 13, 2013, 13 pages.

European Supplementary Search Report for Application No. EP 11 85 2656, dated Oct. 13, 2014, 8 pages.

European Supplementary Search Report for Application No. EP 13 73 6401, dated Sep. 8, 2016, 12 pages.

* cited by examiner

HARD CANDY WITH REDUCED SUGAR

PRIORITY DATA

The present patent application is a 371 of International Application Ser. No. PCT/US11/67361 filed 27 Dec. 2011, which claims benefit from Ser. No. 61/428,303 filed 30 Dec. 2010. The applications listed above are incorporated by reference from as if entirely restated herein.

BACKGROUND OF THE INVENTION

The present invention relates to an improved hard candy, more specifically, relates to an improve hard candy using bulking sweetener agents and doctoring agents that give acceptable clarity, cold flow and stickiness formation stability, while being less cariogenic than traditional sucrose and corn syrup hard candy and while not causing gastrointestinal disturbances.

Consumers like hard candy. Hard candy is sometimes called boiled, glass, amorphous, or rock candy. Typical forms of hard candy are lollipops and lozenges. Hard candy can be transparent, translucent, or opaque, with transparent being preferred by consumers. These confectionary products dissolve slowly in the mouth and deliver flavor and sweetness as they dissolve. They also crunch when chewed, that is, they give an audible sound as they break into smaller pieces when chewed. Additional ingredients, such as flavors and sensates, can be added to the candy formula and they too can be delivered slowly as the hard candy dissolves during sucking or more quickly when chewed and the resulting smaller pieces dissolve.

Hard candy is a food product that is formed by a) heating a mass consisting of sweeteners at least to its boiling point in order to remove water and create a supersaturated solution, b) cooling the heated mass to thicken it, c) forming the mass into individual pieces, and then d) cooling the pieces to room temperature. The preferred combination of ingredients of the cooked mass are such that the combination creates a cooked mass that can be poured when hot into molds or onto flat or semiflat surfaces (where the candy will harden as it cools), or can be sheet and/or shaped when partially cooled using a drop roller, rotary cutter, or other forming apparatus.

By "hard", it is meant that the candy is firm, non-flexible, and non-deforming at room temperature (e.g., 25° C.). The hard mass could contain some crystalline material, though crystalline material reduces candy clarity and the preferred hard candy is translucent. To be commercially acceptable, the hard candy needs to have a non-sticky surface and stable shape, both upon cooling to room temperature and after a reasonable storage at a reasonable relative humidity, that is, the hard candy must be at least as stable as sucrose:corn syrup hard candy at a 80:20 dry solids wt. % ratio.

Typically, hard candy contains one or more bulking sweetener agents, one or more doctoring agents, and usually additional components such as flavors, sensates, colors, and high intensity sweeteners. High intensity sweeteners (e.g., aspartame, sucralose) are added to hard candies to adjust the sweetness to meet particular market preferences. High intensity sweeteners are used in particular when the bulking sweetener agents are less sweet than sucrose.

Both bulking sweetener agents and doctoring agents supply volume and weight to hard candy. The bulking sweetener agent supplies the primary dissolvable mass, which creates a syrup-like solution in the mouth during sucking. Doctoring agents also can supply a dissolvable mass, which creates a syrup-like solution in the mouth. This syrup-like solution is what carries the flavors and sensates to the tongue. Both the bulking sweetener agent and doctoring agent must be chosen such that they will not mask the perception of flavors and sensates.

Typically, the bulking sweetener agent is combined with water and then heated, cooked or boiled to create a supersaturated solution. As the supersaturated solution cools it forms an amorphous, glass state, which then hardens as it cools. Under certain conditions, the bulking sweetener agent will crystallize from this glass state, which causes defects in the hard candy due to loss of clarity and changes in candy texture perceived during chewing and sucking. The key role of the doctoring agent is to interfere with the bulking sweetener agent's tendency to form crystals as the bulking sweetener agent mass cools without causing defects such as softening the candy or creating surface stickiness.

Doctoring agents additionally influence hard candy stability during storage by controlling the water present in the candy, the water being present due to lack of evaporation during heating, cooking, or boiling or absorption during storage. Most doctoring agents and some bulking sweetener agents are hygroscopic and tend to absorb water during storage, especially under high humidities. Excess water in a hard candy that is not controlled by the doctoring agent will start to dissolve the hard candy contents and the hard candy will deform, flow, and/or spread, a situation called "cold flow". The candy could also become sticky as the water dissolves sweetener on the outer surface of the hard candy.

When the bulking agent is very fast crystallizing (such as with isomaltulose and erythritol) a delicate balance is needed between the ratio of bulking sweetener agent and doctoring agent. More doctoring agent will prevent the bulking sweetener agent crystallization, but too much doctoring agent will cause its own defects, including: a) preventing the bulking sweetener agent glass state from hardening, and/or b) increasing the absorption of water by the hard candy during storage causing cold flow and/or surface stickiness.

Sucrose is the traditional bulking sweetener agent for hard candy, with corn syrup being the traditional doctoring agent partnered with it. Sucrose, water, and corn syrup are traditionally heated, cooked, or boiled until there is less than 4% water in the mass, and then cooled. The mass can be shaped by pouring it into molds or onto a flat or semiflat surface and letting it cool to room temperature, or the mass can be shaped by cooling it to a malleable, semi-plastic stage and forming it into pieces with a drop roller, rotary cutter (i.e. pair of rollers or belts with opposing concave openings), or other forming apparatus. Sucrose is hygroscopic, especially while in an amorphous, glass state. Corn syrup is hygroscopic also, but it has a high capacity to absorb water because of its long and short carbohydrate chains, which allows corn syrup to control the free water in a hard candy. Corn syrup, with its long and short carbohydrate chains, can also physically interfere with sucrose crystallization.

A current consumer concern with sucrose based hard candy is cariogenicity. Most sugars (including sucrose, maltose, fructose, and dextrose) are cariogenic. Dental caries is an infectious disease which damages the structure of teeth. To not create dental caries is to be non-cariogenic. Non-cariogenicity or "tooth friendliness" of a substance such as a saccharide or a saccharide derivative may be determined by means of intraoral pH telemetry such as used by Tooth Friendly International, a non-profit organization. In a standard procedure, plaque pH is measured in at least four persons during and for 30 minutes after consumption of a substance to be tested with a plaque-covered electrode. Products which do not lower plaque pH below 5.7, under the test conditions, are considered to lack cariogenic potential. A consumer preferred hard candy is non-cariogenic.

Efforts have been made to improve the healthiness of hard candy. With the goal of reducing cariogenicity, hard candy products have been made with reduced sugar content. Other sugars, including dextrose, fructose, and maltose, have been used to make sugar based hard confections, giving similar benefits to that of sucrose by making a hard candy that is sweet and non-laxative and having similar stability to cold flow and stickiness formation as sucrose. The doctoring agent is usually corn syrup (sometimes with a higher fructose or maltose concentration). Corn syrup keeps the dextrose, fructose, or maltose from crystallizing, and the corn syrup absorbs free water in the hard candy mass. All of these sugars are fermentable in the mouth and may lead to dental caries. These sugars also effect blood glucose levels and have limited use by diabetics.

Sorbitol and isomalt are polyols that have been used in an attempt at making healthier hard candy that is less cariogenic than typical hard candy made with sucrose and corn syrup at a 80:20 dry solids wt. %. As both of these bulking sweetener agents are hygroscopic and are quick to crystallize from a molten or supersaturated state, a doctoring agent needs to be combined with them to make commercially acceptable hard candy, that is, hard candy that is at least as stable to cold flow and stickiness formation as hard candy made with sucrose and corn syrup at a 80:20 dry solids wt. %. A common doctoring agent is hydrogenated starch hydrolysate (HSH), which is a sugar-free syrup containing polyols of various sizes, mostly sorbitol and/or maltitol. As with corn syrup combined with sucrose, HSH can interfere with sorbitol and isomalt crystallization and absorb free water in the heated, cooked, or boiled candy mass. The combination of sorbitol or isomalt with HSH does create a heated, cooked, or boiled mass that can be poured into molds or onto flat or seimiflat surfaces, where it will harden, or them be shaped by a drop roller, rotary cutter, or other forming apparatus. Though these polyols materials are non-cariogenic and are less caloric than sucrose combined with corn syrup, they can cause gastrointestinal disturbance (e.g., laxation).

A disadvantage of many polyols is causation of gastrointestinal disturbances (such as "laxation") upon consumption. Typically, a material is considered not to cause gastrointestinal disturbance (e.g., non-laxative), if such material is either substantially absorbed before entering the large intestine or passes though the large intestine substantially unchanged, in the quantities present in the product consumed. The amount of gastrointestinal disturbance or laxation distress experienced by a consumer of a hard candy typically depends on the sensitivity of the consumer, the specific polyol used in the hard confection, and the amount of hard candy consumed.

Therefore there is a need for a hard candy, which is reduced sucrose, does not create gastrointestinal disturbances, is reduced cariogenic (preferably non-cariogenic), while possessing a consumer acceptable texture and a storage stability at least that of traditional hard candy with sucrose and corn syrup at a 80:20 dry solids wt. %. Consumers do not want to sacrifice clarity and texture for less cariogenicity. Manufactures can not afford to make and sell candy with a shorter shelf life that that of current typical sucrose and corn syrup hard candy.

SUMMARY OF THE INVENTION

A low cariogenic, low-laxation hard candy product having acceptable clarity and cold flow stability, contains a bulking sweetener agent, comprising isomaltulose, trehalose, erythritol or combinations thereof and a doctoring agent, comprising inulin, indigestible dextrin, sucromalt, polydextrose, or combinations thereof; wherein the bulking sweetener agent to doctoring agent ratio is 70/30 to 40/60 dry solids wt. %.

DETAILED DESCRIPTION OF THE INVENTION

In aspects of this invention, certain bulking sweetener agents and doctoring agents are incorporated into a hard candy, such that the final hard candy product has acceptable clarity, cold flow and stickiness formation stability, while being less cariogenic than traditional sucrose and corn syrup hard candy, and while not causing gastrointestinal disturbances.

More specifically, this invention relates to improved formulations for hard candy containing bulking sweetener agent to doctoring agent ratio of 70:30 to 40:60 dry solids wt. % and containing not more than 70 dry solids wt. % sucrose, and containing no corn syrup, and the bulking sweetener agent comprising isomaltulose, trehalose, erythritol, or combinations thereof, and the doctoring agent comprising of inulin, indigestible dextrin, sucromalt, polydextrose or combinations thereof.

A bulking sweetener agent is included in the hard candy of this invention for volume, bulk, hardness, and syrup formation (i.e., as the hard candy is dissolved). The bulking sweetener agents of this invention have a tendency to quickly crystallize, which would make an unacceptable hard candy due to its lack of clarity unless the crystallization is controlled. The doctoring agent is included in the hard candy of this invention to prevent the bulking sweetener agent from crystallizing, while not preventing candy mass from hardening, and to absorb moisture present in the hard candy, so that the hard candy has a cold flow and stickiness formation stability of at least that of sucrose:corn syrup hard candy of a 80:20 dry solids wt. % ratio. Typically, hard candy products, contain sucrose as the bulking sweetener agent and corn syrup as the doctoring agent.

Besides the bulking sweetener agent and doctoring agent, other ingredients are commonly added to hard candy including, but not limited to, flavors, acids, sensates, cooling agents, active ingredients (e.g. drugs and mendicants), and colors. High intensity sweeteners (HIS) can be added to increase the hard candy sweetness level, in particular when the bulking sweetener agent is less sweet than sucrose.

Just shifting the proportion of sucrose to corn syrup in the hard candy formula so that the hard candy contains less sucrose is not a useful option towards reducing product cariogenicity. Corn syrup also contains sucrose. Also, there is a necessary balance to the amount of bulking sweetener agent to the amount of doctoring agent, in order to have a candy that is hard and is stable to cold flow and stickiness formation. Typical sucrose and corn syrup hard candy has a ratio of sucrose to corn syrup of 80:20 dry solids wt. %. Hard candy with ratios of sucrose to corn syrup of 60:40 and 40:60 dry solids wt. % can have less sucrose crystal growth, but the hard candy is usually more susceptible to cold flow and surface stickiness formation than that with the 80:20 ratio.

Typically, when the ratio of sucrose to corn syrup is 80:20 dry solids wt. %, the resulting hard candy has a cold flow and stickiness formation stability that has been found commercially acceptable. Reduction in the sucrose to a weight ratio of 60:40 or 40:60 sucrose to corn syrup creates a reduction in stability to cold flow and stickiness formation. This is also true when the sucrose is replaced with other sugars such as dextrose, fructose, or maltose. Sucrose, dextrose, fructose, maltose, and corn syrup are cariogenic, that is, they create dental caries.

In efforts to make non-cariogenic hard candy, sorbitol and isomalt are polyols that have been combined with hydrogenated starch hydrolysate (HSH) to make hard candy. Though these polyols are non-cariogenic, unfortunately, they can create gastrointestinal disturbances (i.e. laxation).

The problem is how to create hard candy with the clarity and stability of traditional sucrose and corn syrup hard candy, and yet have less cariogenicity and no gastrointestinal disturbance. The solution is hard candy made with a bulking sweetener agent where some or all of the sucrose is replaced with isomaltulose, trehalose, erythritol or combinations thereof and the corn syrup doctoring agent is replaced with inulin, indigestible dextrin, sucromalt, polydextrose, or combinations thereof, and the ratio of bulking sweetener agent to doctoring agent is 70:30 to 40:60 dry solids wt. % and the resulting hard candy contains not more than 70 dry solids wt. % sucrose, preferably not more than 20 dry solids wt. % sucrose, and no corn syrup.

As the goal is to make a hard candy without intestinal disturbance and with less cariogenicity than sucrose, but with acceptable cold flow and stickiness formation stability, the choices for bulking sweetener agents and doctoring agents is limited. Non-limiting examples of bulking sweetener agents are isomaltulose, trehalose, and erythritol. Non-limiting examples of doctoring agents are inulin (linear and branched), indigestible dextrin, sucromalt, and polydextrose.

Isomaltulose is a sugar that can be used as a bulking sweetener agent to make an acceptable hard candy of this invention. Isomaltulose (also called palatinose) is a reducing glucose-fructose disaccharide in which glucose and fructose are linked through their respective 1 and 6 carbon atoms. Isomaltulose commercially is produced enzymatically from sucrose. Because isomaltulose is digested much slower than sucrose, isomaltulose has a lower glycemic response than sucrose making it acceptable to diabetics. Isomaltulose is tooth friendly due to its slow digestion in the mouth. Isomaltulose is non-laxative, and non-cariogenic, even though it is a "sugar". The challenge with isomaltulose is that it is very fast crystallizing from a supersaturated solution or amorphous glass state. A suitable doctoring agent is needed to control the crystallization.

Trehalose is a sugar that also can be used as a bulking sweetener agent to make an acceptable hard candy of this invention. Trehalose, also known as mycose or tremalose, is a natural alpha-linked disaccharide formed by an $\alpha,\alpha$-1,1-glucoside bond between two $\alpha$-glucose units, giving it the name of $\alpha$-D-glucopyranosyl-(1→1)-$\alpha$-D-glucopyranoside. The bonding makes trehalose very resistant to acid hydrolysis. Trehalose is non-laxative and non-cariogenic, even though it is a "sugar". The challenge with Trehalose is that a boiled and cooled trehalose solution does not tend to create a hard candy with a texture similar to that of traditional sucrose and corn syrup candy unless it is combined with another bulking sweetener agent, such as erythritol.

Erythritol is a polyol that can be used as a bulking sweetener agent to make an acceptable hard candy of this invention. Erythritol is a four-carbon sugar alcohol (i.e., polyol). Erythritol is produced from glucose by fermentation with the yeast, *Moniliella pollinis*. Erythritol is absorbed into the bloodstream in the small intestine. Because erythritol is absorbed before it enters the large intestine, it does not normally cause the laxative effects that are often experienced with consumption of other polyols, such as sorbitol, maltitol, isomalt and xylitol. Erythritol can not be metabolized by oral bacteria, so it does not contribute to tooth decay. Erythritol can be used to make hard candy that is non-cariogenic and non-laxative. A challenge with erythritol is that it crystallizes very quickly from a supersaturated syrup or amorphous glass state. Erythritol needs a suitable doctoring agent to control the crystallization so that a hard, clear candy can be produced which will be storage stable.

Inulin is a material that can be used as a doctoring agent to make an acceptable hard candy of this invention. Inulin is a group of oligosaccharides occurring naturally in many plants and belongs to a class of carbohydrates called fructans. Inulin is a prebiotic fermentable fiber and is metabolized by gut flora yields short chain fatty acids, which are reported to increase absorption of calcium, magnesium, and iron. Inulin also promotes an increase in the mass and health of intestinal *Lactobacillus* and *Bifidobacterium* populations. Inulin is composed of linear chains of fructose units linked by $\beta$ (2→1) bonds and is often terminated by a glucose unit. Suitable inulins useful in this invention typically contain chains of around 3 to 60 fructose units. Inulin sources contain polymers in a distribution of chain lengths, which are described by their DP (number of sugar units). Typically short chain linear inulin has DP<20 and long chain linear inulin has DP>20. Typically, linear inulin material is in a long chain form, though other length variations are available. A typical long chain linear inulin source, such as Beneo HP inulin supplied by Orafti, has an average DP>23, creating an inulin material with long polymer chains. A typical short chain linear inulin source, such as DeSugar Inulin supplied by Cargill, has an average DP=10, creating a inulin material with short polymer chains. A branched inulin (also called phlein), such as BoiAgave™, supplied by GTC Nutrition, has a high degree of polymerization. Inulin has a minimal impact on blood sugar and does not raise blood triglycerides, making it generally considered suitable for diabetics.

Indigestible dextrin is a material that can be used as a doctoring agent to make an acceptable hard candy of this invention. Indigestible dextrin is a group of low molecular weight carbohydrates produced by hydrolysis of starch by acid in a roasting process. These dextrins are mixtures of $\alpha$-(1→4)-linked D-glucose polymers starting with an $\alpha$-(1→6) bond, which are then treated with additional roasting to create branched carbohydrates or pyrodextrins. The dextrins are further treated with enzymes to make them highly branched and virtually indigestible. Indigestible dextrins do not contribute to dental caries (i.e., are non-cariogenic) due to their low reducing sugar levels. They do not cause gastrointestinal disturbances at the levels of use in chewing gum. Typical indigestible dextrins contain about 10 to 30 (preferably 10 to 25) saccharide units. Varieties of such indigestible dextrins are sold under trade names of Fibersol™ and Nutriose™. Fibersol™ is marketed by Fibersol America, a division of Matsutani Chemical Industry Co., Ltd of Hyogo-Pref., Japan. Nutriose™ is marketed by Roquette Freres, of Lestrem, France.

Polydextrose is a material that can be used as a doctoring agent to make an acceptable hard candy of this invention. Polydextrose (available under the trade name Litesse™ from Danisco) is a soluble, random polymer of dextrose containing minor (less than about 10 wt. %) amounts of sorbitol (at least 2 wt. %) and citric acid. Typical polydextrose polymers contain around 10 to 50 saccharide units, preferably 20 to 40 saccharide units.

Sucomalt is a material that can be used as a doctoring agent to make an acceptable hard candy of this invention. Sucomalt (available under the trade name of Sucomalt™ from Cargill) is a soluble oligoglucose. Sucromalt does not cause gastrointestinal distress. Currently, sucromalt supplied by Cargill contains about 35% mono- and di-saccharides (e.g., fructose).

An aspect of the present invention is directed to a hard candy, comprised of at least 95 wt. % solids, wherein the solids comprises bulking sweetener agent to doctoring agent in the ratio of 70:30 to 40:60 dry solids wt. %, wherein the bulking sweetener agent is isomaltulose, trehalose, erythritol or combinations thereof, and the doctoring agent is inulin (linear or branched), indigestible dextrin, polydextrose, sucromalt or combinations thereof.

An aspect of the present invention is directed to a hard candy containing less than 20 wt. % sucrose, which does not cause intestinal disturbance and is at least as stable to cold flow and stickiness formation as hard candy containing sucrose and corn syrup in a 80:20 dry solids wt. % ratio.

An aspect of the present invention is directed to a hard candy containing less than 70 wt. % sucrose, which does not cause intestinal disturbance and is at least as stable to cold flow and stickiness formation as hard candy containing sucrose and corn syrup in a 80:20 dry solids wt. % ratio.

An aspect of the present invention is directed to a hard candy, which contains a bulking sweetener agent comprising isomaltulose, trehalose, erythritol or combinations thereof, and a doctoring agent comprising inulin (linear or branched), indigestible dextrin, polydextrose, sucromalt of combinations thereof, where the ratio of bulking sweetener agent to doctoring agent is 70:30 to 40:60 dry solids wt. %, and the resulting hard candy is at least as stable to cold flow and stickiness formation as hard candy containing sucrose and corn syrup in a 80:20 dry solids wt. % ratio.

An aspect of the present invention is directed to a hard candy, which contains a bulking sweetener agent comprising isomaltulose, trehalose, erythritol or combinations thereof, and a doctoring agent comprising inulin (linear or branched), indigestible dextrin, polydextrose, sucromalt of combinations thereof, where the ratio of bulking sweetener agent to doctoring agent is 70:30 to 40:60 dry solids wt. %, and the resulting hard candy is at least as stable to cold flow and stickiness formation as hard candy containing sucrose and corn syrup in a 80:20 dry solids wt. % ratio and the hard candy contains less than 70 dry solids wt. % sucrose.

An aspect of the present invention is directed to a hard candy, which contains a bulking sweetener agent comprising isomaltulose, and a doctoring agent comprising branched inulin, where the ratio of bulking sweetener agent to doctoring agent is 70:30 to 40:60 dry solids wt. %, and the resulting hard candy is at least as stable to cold flow and stickiness formation as hard candy containing sucrose and corn syrup in a 80:20 dry solids wt. % ratio and the hard candy contains less than 20 dry solids wt. % sucrose. An aspect of the present invention is directed to a hard candy, which contains a bulking sweetener agent comprising isomaltulose, and a doctoring agent comprising sucromalt, where the ratio of bulking sweetener agent to doctoring agent is 70:30 to 40:60 dry solids wt. %, and the resulting hard candy is at least as stable to cold flow and stickiness formation as hard candy containing sucrose and corn syrup in a 80:20 dry solids wt. % ratio and the hard candy contains less than 20 dry solids wt. % sucrose. An aspect of the present invention is directed to a hard candy, which contains a bulking sweetener agent comprising trehalose and erythritol, and a doctoring agent comprising inulin and brown rice syrup, where the ratio of bulking sweetener agent to doctoring agent is 70:30 to 40:60 dry solids wt. %, and the resulting hard candy is at least as stable to cold flow and stickiness formation as hard candy containing sucrose and corn syrup in a 80:20 dry solids wt. % ratio and the hard candy contains less than 20 dry solids wt. % sucrose. An aspect of the present invention is directed to a hard candy, which contains a bulking sweetener agent comprising trehalose and erythritol, and a doctoring agent comprising inulin, where the ratio of bulking sweetener agent to doctoring agent is 70:30 to 40:60 dry solids wt. %, and the resulting hard candy is at least as stable to cold flow and stickiness formation as hard candy containing sucrose and corn syrup in a 80:20 dry solids wt. % ratio and the hard candy contains less than 20 dry solids wt. % sucrose.

An aspect of the present invention is a hard candy, comprising at least 40 dry solids wt. % trehalose and at least 40 dry solids wt. % inulin (linear and/or branched).

An aspect of the present invention is a hard candy, comprising at least 20 dry solids wt. % trehalose, at least 20 dry solids wt. % sucrose, and at least 30 dry solids wt. % branched inulin.

An aspect of the present invention is a hard candy, comprising at least 50 dry solids wt. % isomaltulose, and at least 20 dry solids wt. % branched inulin.

An aspect of the present invention is a hard candy, comprising at least 50 dry solids wt. % erythritol and at least 20 dry solids wt. % doctoring agent selected from the group consisting of inulin, indigestible dextrin, sucromalt, polydextrose, and combinations thereof.

An aspect of the present invention is a hard candy, comprising at least 50 dry solids wt. % isomaltulose and at least 20% doctoring agent selected from the group consisting of inulin, indigestible dextrin, sucromalt, polydextrose, and combinations thereof.

An aspect of the present invention is a hard candy, comprising at least 50 wt. % isomaltulose and at least 25 wt. % indigestible dextrin.

An aspect of the present invention is a hard candy, comprising at least 25 wt. % trehalose, at least 5 wt. % erythritol, and at least 20 wt. % inulin, An aspect of the present invention is a hard candy, comprising at least 25 wt. % trehalose, at least 5 wt. % erythritol, and at least 45 wt. % inulin.

Hard candy with less cariogenicity then typical sucrose and corn syrup hard candy (at 80:20 ratio) can be made using combinations of bulking sweetener agents (e.g. isomaltulose, trehalose, erythritol, and combinations thereof) and doctoring agents (e.g. inulin, indigestible dextrin, polydextrose, sucromalt, and combinations thereof) in ratios of 70/30 to 40/60 dry solids wt. %, the resulting hard candy having at least the cold flow and stickiness formation stability of sucrose and corn syrup hard candy at 80:20 ratio.

EXAMPLES AND COMPARATIVE RUNS

The following comparative runs and examples of the invention are provided to illustrate, but not limit, the invention that is defined by the attached claims.

Table 1 gives the formulas for a control (sucrose:corn syrup at 80:20 wt %) and seven alternatives. Samples 2-5: Corn syrup is replaced with linear inulin at various ratios. Samples 6-9: Sucrose is replaced with isomalt and corn syrup is replaced with linear inulin at various ratios.

Surprisingly, the inventor found that inulin was an acceptable doctoring agent (i.e., replacement for corn syrup) in hard candy when the bulking sweetener agent was sucrose or isomalt. This is surprising, as inulin is usually added in chewy candy formulations to supply the flexible material in the candy and to absorb and control high percentages of moisture, while keeping the bulking sweetener agent from hardening. Here inulin does appear to control the moisture in the hard candy, but does not appear to interfere with the bulking sweetener agent's ability to harden.

When corn syrup doctoring agent was replaced with inulin doctoring agent, hard candy made within a range of 80/20 to 40/60 dry solids wt. % bulking sweetener agent to doctoring agent, the resulting hard candy was as stable as, or more stable than, hard candy made with sucrose and corn syrup in the ratio of 80/20 wt % after storage at 23° C./50% RH; 45° C./33% RH, and 30° C./70% RH for 8 days. Inulin was able to keep the hygroscopic bulking sweetener agents from crystallizing, and assisted in stabilizing the hard candy from cold flow, particularly at 30° C./70% RH. Inulin is sometimes used in chewy candy to hold moisture in order to give the chewy candy an elastic, bouncy character. Inulin was tested to see what it's effect would be in hard handy. Isomalt was tested to see the effect of using inulin with a known, very hygroscopic sugar-free bulking sweetener agent at different ratios of bulking sweetener agent to doctoring agent.

TABLE 1

Formulas: Sucrose and Linear Inulin & Isomalt and Linear Inulin

| | Control: Sucrose/Corn Syrup (80/20) 1 | Sucrose/ Linear Inulin (80/20) 2 | Sucrose/ Linear Inulin (60/40) 3 | Sucrose/ Linear Inulin (40/60) 4 | Isomalt/ Linear Inulin (20/80) 5 | Isomalt/ Linear Inulin (80/20) 6 | Isomalt/ Linear Inulin (60/40) 7 | Isomalt/ Linear Inulin (40/60) 8 |
|---|---|---|---|---|---|---|---|---|
| Sugar | 79.66 | 79.65 | 62.57 | 43.59 | 22.15 | 0.00 | 0.00 | 0.00 |
| Isomalt | 0.00 | 0.00 | 0.00 | 0.00 | 0.00 | 79.65 | 62.57 | 43.59 |
| Corn syrup | 16.52 | 0.00 | 0.00 | 0.00 | 0.00 | 0.00 | 0.00 | 0.00 |
| Linear Inulin | 0.00 | 16.52 | 33.61 | 52.59 | 74.03 | 16.52 | 33.61 | 52.59 |
| Water | 0.00 | 0.00 | 0.00 | 0.00 | 0.00 | 0.00 | 0.00 | 0.00 |
| HIS | 0.07 | 0.07 | 0.07 | 0.07 | 0.07 | 0.07 | 0.07 | 0.07 |
| Strawberry Flavor | 0.01 | 0.01 | 0.01 | 0.01 | 0.01 | 0.01 | 0.01 | 0.01 |
| Citric acid | 3.74 | 3.74 | 3.74 | 3.74 | 3.74 | 3.74 | 3.74 | 3.74 |

HIS = high intensity sweetener

The hard candy products made in Table 1 were produced by combining inulin, sucrose or isomalt, and water, heating the combination until the cooked mass reached about 290° F. (143° C.) (no vacuum), adding HIS (high intensity sweeteners), acid and flavor, and then cooling the cooked mass until it had a malleable, plastic-like texture. The cooked mass was finally processed through a drop roller. The resulting hard candy pieces were cooled to room temperature and stored at different temperatures and relative humidities.

Table 1 runs 2 through 8 all had reduced sucrose content from the control due to less sucrose as the bulking sweetener agent and due to less corn syrup as the doctoring agent, which made them less carriogenic than the control. Table 1 runs 3, 4, and 5 were formulated to have corn syrup replaced with inulin. Runs 1, 3, 4, and 5 had different ratios of bulking sweetener agent and doctoring agent. Table 1 runs 6, 7, and 8 were formulated to have the sucrose of the control replaced with isomalt and the corn syrup to be replaced with inulin. Though run 6 contained the same ratio of bulking sweetener agent to doctoring agent as run 1 (control), runs 7 and 8 had different ratios of bulking agent to doctoring agent. All of these formulas made hard candy pieces.

Table 2 includes sensorial test data on runs 1 (control), 3, 4, and 5 after less than a week storage at room 23° C. and 50% RH (i.e. room temperature).

TABLE 2

Sensory Results: Sucrose and Linear Inulin Hard Candy

| | Run # | | | |
|---|---|---|---|---|
| | 1 | 3 | 4 | 5 |
| Characteristic | Sucrose/Corn Syrup Control (80/20) | Sucrose/ Linear Inulin (60/40) | Sucrose/ Linear Inulin (40/60) | Sucrose/ Linear Inulin (20/80) |
| Clarity | 4.86 | 5.86 | 5.71 | 7.00 |
| Flavor | 5.43 | 5.00 | 5.43 | 4.71 |

The runs in Table 2 were evaluated blind in random order for amount of clarity (1-9, clear to opaque) and amount of flavor delivery (1-9, low to high). 80/20 wt % is a typical ratio of sucrose to corn syrup in a hard candy. By replacing the corn syrup with inulin and varying the ratio of sucrose to doctoring agent, the character of the resulting hard candy changed. In Table 1, the sensory results show that of these runs, 3 and 4 had flavor delivery similar to that of 1 (control), but run 5 had less flavor delivery. The sensory results also show that runs 3 and 4 had clarity less than 1, and run 5 had even less clarity. Though all of these formulas made hard candy pieces, like the control, their character was not always the same as that of the control. In particular, too much doctoring agent can interfere with flavor delivery and clarity.

Table 3 contains shelf life data for runs in Table 1 that were held at 23° C. at 50% RH for 14 days.

TABLE 3

Results: Cold Flow Test - 23° C./50% RH

| | Run # | | | | | | |
|---|---|---|---|---|---|---|---|
| | 1 | 2 | 3 | 4 | 6 | 7 | 8 |
| % Change from Day 0 At 14 Days | Control: Sucrose/Corn Syrup (80/20) | Sucrose/Linear Inulin (80/20) | Sucrose/Linear Inulin (60/40) | Sucrose/Linear Inulin (40/60) | Isomalt/Linear Inulin (80/20) | Isomalt/Linear Inulin (60/40) | Isomalt/Linear Inulin (40/60) |
| Weight | 0.1 | 0.1 | 0.1 | 0.2 | 0.1 | 0.4 | 0.9 |
| Width | 0.0 | 0.0 | 0.0 | 0.0 | 0.0 | 0.0 | 0.0 |
| Height | 0.0 | 0.0 | 0.0 | 0.0 | 0.0 | 0.0 | 0.0 |

Runs from Table 1 were stored for 14 days at 23° C./50% RH and then weighed and measured (piece width and height) after 14 days. The data in Table 3 shows that the more inulin in the hard candy, the more water was adsorbed, though this is much more noticeable in the isomalt runs. Isomalt is very hygroscopic. Width and height changes were not appreciable, showing that these runs were all as stable, or more stable, than the control as to cold flow.

Tables 4, 5, and 6 contain cold flow shelf life data for runs in Table 1 that were held at 45° C./33% RH for 8 days.

TABLE 4

Results: Cold Flow Test - 45° C./33% RH

| Weight Change (%) | Run # 1 Control: Sucrose/Corn Syrup (80/20) | 2 Sucrose/Linear Inulin (80/20) | 3 Sucrose/Linear Inulin (60/40) | 4 Sucrose/Linear Inulin (40/60) | 6 Isomalt/Linear Inulin (80/20) | 7 Isomalt/Linear Inulin (60/40) | 8 Isomalt/Linear Inulin (40/60) |
|---|---|---|---|---|---|---|---|
| Day 3 | 0.5 | 0.7 | 0.6 | N/A | 0.3 | 0.4 | 0.4 |
| Day 6 | 0.8 | 1.1 | 1.0 | N/A | 0.5 | 0.6 | 0.6 |
| Day 8 | 1.1 | 1.4 | 1.2 | N/A | 0.6 | 0.8 | 0.8 |

N/A = not available

TABLE 5

Results: Cold Flow Test - 45° C./33% RH

| Width Change (%) | Run # 1 Control: Sucrose/Corn Syrup (80/20) | 2 Sucrose/Linear Inulin (80/20) | 3 Sucrose/Linear Inulin (60/40) | 4 Sucrose/Linear Inulin (40/60) | 6 Isomalt/Linear Inulin (80/20) | 7 Isomalt/Linear Inulin (60/40) | 8 Isomalt/Linear Inulin (40/60) |
|---|---|---|---|---|---|---|---|
| Day 3 | 35.0 | 45.8 | 29.4 | 41.2 | 47.3 | 49.0 | 48.2 |
| Day 6 | 45.7 | 62.0 | 35.4 | 52.9 | 46.8 | 60.9 | 53.8 |
| Day 8 | 51.1 | 59.2 | 38.9 | 57.7 | 46.1 | 63.7 | 54.9 |

TABLE 6

Cold Flow Test - 45° C./33% RH

| Height Change (%) | Run # 1 Control: Sucrose/Corn Syrup (80/20) | 2 Sucrose/Linear Inulin (80/20) | 3 Sucrose/Linear Inulin (60/40) | 4 Sucrose/Linear Inulin (40/60) | 6 Isomalt/Linear Inulin (80/20) | 7 Isomalt/Linear Inulin (60/40) | 8 Isomalt/Linear Inulin (40/60) |
|---|---|---|---|---|---|---|---|
| Day 3 | −34.6 | −36.9 | −35.4 | −36.5 | −54.2 | −54.7 | −42.1 |
| Day 6 | −48.8 | −46.0 | −46.5 | −34.0 | −52.0 | −57.1 | −51.9 |
| Day 8 | −57.9 | −50.0 | −52.8 | −48.2 | −54.4 | −64.3 | −58.6 |

Negative number is due to height decreasing over storage time.

Tables 4, 5, and 6 contain data from runs in Table 1 stored at 45° C./33% RH and then weighed and measured (width and height) on day 3, 6, and 8. The data in Tables 4, 5, and 6 show that the weight change for runs 2-8 was similar to that of the control. The width change for runs 2, 5, 6 and 8 was similar to that of the control. Run 7 was slightly more and run 3 was slightly less than the control. All of the runs had similar height changes to that of the control. Overall, runs 2-8 were not very different, if at all, from that of the control.

Tables 7, 8, and 9 contain cold flow shelf life data for runs in Table 1 that were held at 45° C./33% RH for 8 days.

TABLE 7

Results: Cold Flow Test - 30° C./70% RH

| | Run # | | | | | | |
|---|---|---|---|---|---|---|---|
| | 1 | 2 | 3 | 4 | 6 | 7 | 8 |
| Weight Change (%) | Control: Sucrose/Corn Syrup (80/20) | Sucrose/Linear Inulin (80/20) | Sucrose/Linear Inulin (60/40) | Sucrose/Linear Inulin (40/60) | Isomalt/Linear Inulin (80/20) | Isomalt/Linear Inulin (60/40) | Isomalt/Linear Inulin (40/60) |
| Day 3 | 24.1 | 25.3 | 23.3 | 22.6 | 6.4 | 11.0 | 19.7 |
| Day 6 | 25.4 | 25.7 | 24.7 | 25.3 | 7.1 | 12.9 | 21.8 |
| Day 8 | 25.9 | 25.3 | 24.2 | 26.1 | 7.4 | 14.0 | 22.4 |

TABLE 8

Results: Cold Flow Test - 30° C./70% RH

| | Run # | | | | | | |
|---|---|---|---|---|---|---|---|
| | 1 | 2 | 3 | 4 | 6 | 7 | 8 |
| Width Change (%) | Control: Sucrose/Corn Syrup (80/20) | Sucrose/Linear Inulin (80/20) | Sucrose/Linear Inulin (60/40) | Sucrose/Linear Inulin (40/60) | Isomalt/Linear Inulin (80/20) | Isomalt/Linear Inulin (60/40) | Isomalt/Linear Inulin (40/60) |
| Day 3 | 57.6 | 71.4 | 68.7 | 70.0 | 14.0 | 24.4 | 19.2 |
| Day 6 | 109.3 | 72.6 | 81.4 | 77.0 | 9.0 | 26.0 | 17.5 |
| Day 8 | 169.0 | 77.2 | 83.4 | 80.3 | 8.0 | 36.6 | 22.3 |

TABLE 9

Results: Cold Flow Test - 30° C./70% RH

| | Run # | | | | | | |
|---|---|---|---|---|---|---|---|
| | 1 | 2 | 3 | 4 | 6 | 7 | 8 |
| Height Change (%) | Control: Sucrose/Corn Syrup (80/20) | Sucrose/Linear Inulin (80/20) | Sucrose/Linear Inulin (60/40) | Sucrose/Linear Inulin (40/60) | Isomalt/Linear Inulin (80/20) | Isomalt/Linear Inulin (60/40) | Isomalt/Linear Inulin (40/60) |
| Day 3 | −47.4 | −55.3 | −58.5 | −55.7 | −3.8 | −18.2 | −43.6 |
| Day 6 | −66.8 | −58.2 | −61.1 | −75.3 | −22.4 | −22.9 | −55.2 |
| Day 8 | −74.3 | −68.1 | −62.6 | −79.9 | −23.3 | −28.1 | −61.4 |

Negative number is due to height decreasing over storage time.

Tables 7, 8, and 9 contain data from runs in Table 1 stored at 30° C./70% RH and then weighed and measured (width and height) on day 3, 6, and 8. The data in Tables 7, 8, and 9 show that that the weight change for runs 2 4 was similar to that of the control, but the weight change of runs 6-8 was much less than the control. The width change for runs 2-8 was much less than the width change of the control, with the width change of runs 6-8 the least. The height change for runs 2-4 was similar to that of the control. Of the isomalt runs, run 8 was similar to the control, but runs 6 and 7 had less height change. Overall, runs 2-8 were very different from the control, as they were much more stable to cold flow than the control.

Hard candy made with sucrose and corn syrup (at 80:20 dry solids wt. % ratio) is already somewhat unstable during storage, especially in humid conditions. Both sucrose and corn syrup are hygroscopic. Stored sucrose based hard candy can absorb water from the atmosphere during storage, and if the doctoring agent cannot control that water, then the hard candy "cold flows". Inulin is hygroscopic like corn syrup solids, and as such can absorb and trap some of the water absorbed by the hard candy. The data show that inulin was better at preventing cold flow in a sucrose based hard candy than corn syrup solids. The results also showed that bulking sweetener agents, such as isomalt, exist that can make hard candy, which is more stable to cold flow than sucrose. Thus, the goal is to reduce sugar content in hard candy while not increasing the tendency to cold flow during storage by choosing bulking sweetener agents and doctoring agents and their effective ratio.

Not all bulking sweetener agent and doctoring agent combinations will make a hard candy piece when cooked and cooled. For example, a hard candy formula with about 90/10 wt % trehalose to linear inulin will not harden, unless other bulking sweetener agents or doctoring agents are added. But, 50:50 dry solids wt. % trehalose to linear inulin will harden and consumers found it similar to the 80:20 sucrose to corn syrup control in several characteristics. Tables 10-16 give formulas for containing various combinations bulking sweetener agents and doctoring agents. All of these formulas made hard candy runs. Most of the runs were tested in consumer sensory tests against sucrose and corn syrup controls at 80:20 dry solids wt. % ratio.

Table 10 gives formulas for hard candy with sucrose and different doctoring agents.

TABLE 10

Formulas with Sugars and Different Doctoring Agents

| | Run # | | | | |
|---|---|---|---|---|---|
| Ingredients | 10 Sucrose/ Corn Syrup Control | 11 Sucrose/ Linear Inulin | 12 Sucrose/ Branched Inulin | 13 Sucrose/ Trehalose/ Branched Inulin | 14 Trehalose/ Linear Inulin |
| Sucrose | 81.80 | 66.88 | 66.89 | 33.45 | 0.00 |
| Trehalose | 0.00 | 0.00 | 0.00 | 33.45 | 49.06 |
| Corn Syrup | 16.56 | 0.00 | 0.00 | 0.00 | 0.00 |
| Linear Inulin | 0.00 | 31.26 | 0.00 | 0.00 | 49.06 |
| Branched Inulin | 0.00 | 0.00 | 31.25 | 31.23 | 0.00 |
| HIS | 0.00 | 0.08 | 0.08 | 0.10 | 0.11 |
| Flavor | 0.01 | 0.01 | 0.01 | 0.01 | 0.01 |
| Citric Acid | 1.63 | 1.77 | 1.77 | 1.77 | 1.77 |

The hard candy products in Table 10 were produced by mixing, cooking until 257° F. (147° C.), and then forming semi-cooled mass into individual hard candy pieces using a drop roller.

Table 11 contains the consumer sensory test results for runs in Table 10 for hard candy with various bulking sweetener agents and doctoring agents.

TABLE 11

Consumer Sensory Results: Sugars and various doctoring agents

| | Run 10 Sucrose/ Corn Syrup Control (A) | Run 11 Sucrose/ Linear Inulin (B) | Run 12 Sucrose/ Branched Inulin (C) | Run 13 Sucrose/ Trehalose/ Branched Inulin (D) | Run 14 Trehalose/ Linear Inulin (E) |
|---|---|---|---|---|---|
| 30 seconds | | | | | |
| Flavor Liking | 6.51 | 7.70 AE | 7.60 AE | 7.64 AE | 6.73 |
| Flavor Strength | 2.14 | 3.02 AE | 2.94 AE | AE | 2.70 A |
| 3 minutes | | | | | |
| Overall Liking | 6.22 | 7.48 AE | 7.32 AE | 7.51 AE | 6.01 |
| Flavor Liking | 5.81 | 7.53 AE | 7.40 AE | 7.59 AE | 5.99 |
| Flavor Strength | 2.02 | 3.06 ACE | 2.84 AE | 3.05 ACE | 2.74 A |
| Texture Liking | 7.22 E | 7.40 E | 7.20 E | 7.28 E | 6.80 | n = 81
Significance is at 95% c.i. one-tailed test

The hard candy runs in Table 11 were evaluated in sensory testing with consumers (n=81) in a blind and random order. Participants tasted all found runs. Runs were evaluated on a 1-9 scale (9 being the highest) for liking scores, and on a 1-5 scale (5 being the highest) for strength scores. After 30 seconds, participants were to evaluate the runs for flavor liking and flavor strength. After 3 minutes, participants were to evaluate runs for overall liking, flavor liking, flavor strength, and texture liking. Letters after the test data number are for indicating a statistically significant difference at a 95% confidence (one-tail test) from a different run.

The consumer sensory results in Table 11 show that runs 11, 12 and 13 had significantly higher scores from the control and run 10 for flavor liking, flavor strength, and overall flavor. Runs 11, 12 and 13 had similar texture liking scores to that of the control. Run 14 was similar to the control for all results, except flavor strength, where run 14 had significantly higher scores.

Table 12 gives formulas for hard candy with different bulking sweetener agents and different doctoring agents.

TABLE 12

Hard Candy with Isomaltulose: Formulas

| | Run # | | | | | | |
|---|---|---|---|---|---|---|---|
| Ingredients | 15 Sucrose/Corn Syrup Control | 16 Isomaltulose/ Brown Rice Syrup | 17 Isomaltulose/ Sucromalt | 18 Isomaltulose/ Branched Inulin | 19 Isomaltulose/ Linear Inulin | 20 Isomaltulose/ Sucromalt/ Erythritol | 21 Erythritol/ Sucromalt |
| Sucrose | 81.80 | 0.00 | 0.00 | 0.00 | 0.00 | 0.00 | 0.00 |
| Isomaltulose | 0.00 | 64.33 | 64.88 | 66.91 | 67.05 | 32.65 | 0.00 |
| Erythritol | 0.00 | 0.00 | 0.00 | 0.00 | 0.00 | 32.62 | 67.36 |
| Corn Syrup | 16.56 | 0.00 | 0.00 | 0.00 | 0.00 | 0.00 | 0.00 |
| Brown Rice Syrup | 0.00 | 33.88 | 0.00 | 0.00 | 0.00 | 0.00 | 0.00 |
| Branched Inulin | 0.00 | 0.00 | 0.00 | 31.22 | 0.00 | 0.00 | 0.00 |
| Linear Inulin | 0.00 | 0.00 | 0.00 | 0.00 | 31.44 | 0.00 | 0.00 |
| Sucromalt | 0.00 | 0.00 | 33.31 | 0.00 | 0.00 | 33.53 | 31.44 |
| HIS | 0.00 | 0.08 | 0.08 | 0.08 | 0.08 | 0.08 | 0.08 |
| Flavor | 0.01 | 0.01 | 0.01 | 0.01 | 0.01 | 0.01 | 0.01 |
| Citric Acid | 1.63 | 1.70 | 1.72 | 1.78 | 1.42 | 1.12 | 1.12 |

The hard candy products in Table 12 were produced by mixing, cooking until 257° F. (147° C.), and then forming semi-cooled mass into individual hard candy pieces using a drop roller.

Table 13 contains the consumer sensory test results for runs 15, 16, 17 and 18 in Table 12 for hard candy with isomaltulose and various doctoring agents.

TABLE 13

Consumer Sensory Results: Isomaltulose with various doctoring agents

| | Run # | | | |
|---|---|---|---|---|
| | 15 Sucrose/Corn Syrup Control (A) | 16 Isomaltulose/ Brown Rice Syrup (B) | 17 Isomaltulose/ Sucromalt (C) | 18 Isomaltulose/ Branched Inulin (D) |
| 30 seconds | | | | |
| Flavor Liking | 7.46 B | 6.87 | 7.45 B | 7.12 |
| Flavor Strength | 2.84 d | 2.78 | 2.95 D | 2.60 |
| 3 minutes | | | | |
| Overall Liking | 7.49 BD | 6.72 | 7.22 B | 7.02 |
| Flavor Liking | 7.33 B | 6.42 | 7.19 B | 7.01 B |
| Flavor Strength | 3.05 Bd | 2.65 | 3.12 BD | 2.82 |
| Texture Liking | 7.32 D | 7.08 | 7.31 d | 6.95 | n = 85
Significance is at 95% c.i. one-tailed test

The hard candy runs in Table 13 were evaluated in sensory testing with consumers (n=85) in a blind and random order. Participants tasted all four runs. Runs were evaluated on a 1-9 scale (9 being the highest) for liking scores, and on a 1-5 scale (5 being the highest) for strength scores. After 30 seconds, participants were to evaluate the runs for flavor liking and flavor strength. After 3 minutes, participants were to evaluate runs for overall liking, flavor liking, flavor strength, and texture liking. Letters after the test data number are for indicating a statistically significant difference at a 95% confidence (one-tail test) from a different run.

The consumer sensory results in Table 13 show that run 16 has scores significantly less than that of the control and run 17 for most of the characteristics tested. The results of this test group show that different doctoring agents can create product differences, even when all have the same bulking sweetener agent.

Table 14 contains descriptions of hard candy formed for runs 15-23 in Table 12.

TABLE 14

Description of Formed Hard Candy

| Run | | Description of Formed Hard Candy |
|---|---|---|
| 15 | Sucrose/Corn Syrup Control | Nice hard candy, good texture, not sticky. |
| 16 | Isomaltulose/Brown Rice Syrup | Nice hard candy, good texture, not sticky. |
| 17 | Isomaltulose/Sucromalt | Nice hard candy, good texture, not sticky, clean sweetness. |

TABLE 14-continued

Description of Formed Hard Candy

| Run | | Description of Formed Hard Candy |
|---|---|---|
| 18 | Isomaltulose/Branched Inulin | Nice hard candy, good texture, not sticky, flavor note from branched inulin. |
| 19 | Isomaltulose/Linear Inulin | Nice hard candy in the beginning, but became sticky later on. |
| 20 | Isomaltulose/Sucromalt/Erythritol | Wouldn't harden. No candy formed. |
| 21 | Erythritol/Sucromalt | The deposited candy set, formed hard candy, not sticky. |

The run descriptions in Table 14 are of hard candy made with various bulking sweetener agents and doctoring agents.

Table 15 gives formulas for hard candy with different bulking sweetener agents and different doctoring agents.

TABLE 15

Formulas for runs with various bulking and doctoring agents.

| | Runs # | | | |
|---|---|---|---|---|
| Ingredients | 22 Sucrose/ Corn Syrup Control (A) | 23 Isomaltulose/ Indigestible Dextrin (B) | 24 Trehalose/ Erythritol/Linear Inulin/Brown Rice Syrup (C) | 25 Trehalose/ Erythritol/ Linear Inulin (D) |
| Sucrose | 81.80 | 0.00 | 0.00 | 0.00 |
| Trehalose | 0.00 | 0.00 | 31.45 | 31.32 |
| Isomaltulose | 0.00 | 66.87 | 0.00 | 0.00 |
| Erythritol | 0.00 | 0.00 | 10.48 | 10.45 |
| Corn Syrup | 16.56 | 0.00 | 0.00 | 0.00 |
| Indigestible Dextrin | 0.00 | 31.22 | 0.00 | 0.00 |
| Brown Rice Syrup | 0.00 | 0.00 | 24.82 | 0.00 |
| Linear Inulin | 0.00 | 0.00 | 31.45 | 56.44 |
| HIS | 0.00 | 0.13 | 0.12 | 0.12 |
| Flavor | 0.01 | 0.01 | 0.01 | 0.01 |
| Citric Acid | 1.63 | 1.77 | 1.67 | 1.66 |

The hard candy products in Table 15 were produced by mixing, cooking until 257° F. (147° C.), and then forming semi-cooled mass into individual hard candy pieces using a drop roller.

Table 16 contains the consumer sensory test results for runs 22, 23, 24 and 25 in Table 15 for hard candy with various bulking sweetener agents and doctoring agents.

TABLE 16

Consumer Sensory Results: Runs with various bulking and doctoring agents

| | Run # | | | |
|---|---|---|---|---|
| | 22 Sucrose/Corn Syrup Control (A) | 23 Isomaltulose/ Indigestible Dextrin (B) | 24 Trehalose/ Erythritol/ Linear Inulin/Brown Rice Syrup (C) | 25 Trehalose/ Erythritol/ Linear Inulin (D) |
| 30 seconds | | | | |
| Flavor Liking | 6.75 | 7.32 A | 7.49 A | 7.25 A |
| Flavor Strength | 2.38 | 2.83 A | 2.79 A | 2.96 A |
| 3 minutes | | | | |

TABLE 16-continued

Consumer Sensory Results: Runs with various bulking and doctoring agents

| | Run # | | | |
|---|---|---|---|---|
| | 22 Sucrose/Corn Syrup Control (A) | 23 Isomaltulose/ Indigestible Dextrin (B) | 24 Trehalose/ Erythritol/ Linear Inulin/Brown Rice Syrup (C) | 25 Trehalose/ Erythritol/ Linear Inulin (D) |
| Overall Liking | 6.55 | 7.23 A | 7.29 A | 6.97 A |
| Flavor Liking | 6.39 | 6.95 A | 7.05 A | 6.84 |
| Flavor Strength | 2.31 | 2.87 A | 2.75 A | 2.79 A |
| Texture Liking | 7.09 | 7.43 A | 7.60 A | 7.38 | n = 77
Significance is at 95% c.i. one-tailed test

The hard candy runs in Table 14 were evaluated in sensory testing with consumers (n=77) in a blind and random order. Participants tasted all four runs. Runs were evaluated on a 1-9 scale (9 being the highest) for liking scores, and on a 1-5 scale (5 being the highest) for strength scores. After 30 seconds, participants were to evaluate the runs for flavor liking and flavor strength. After 3 minutes, participants were to evaluate runs for overall liking, flavor liking, flavor strength, and texture liking. Letters after the test data number are for indicating a statistically significant difference at a 95% confidence (one-tail test) from a different run.

The consumer sensory results in Table 14 show that the hard candy runs 23-25 had significantly higher sensory test results than the control for most of the attributes tested. Trehalose appears to make more acceptable hard candy when combined with other bulk sweetening agents then when on it's own.

The results of the sensory testing show that combinations of bulking sweetener agents and doctoring agents in the ratios of 80/20 to 20/80 wt % (preferably 70/30 to 30/70) can be used to make hard candy at least as stable to sucrose/corn syrup hard candy and with at least sensory qualities similar to sucrose/corn syrup hard candy.

The compositions and methods of the present invention are capable of being incorporated in the form of a variety of embodiments, only a few of which have been illustrated and described above. The invention may be embodied in other forms without departing from its spirit or essential characteristics. The described embodiments are to be considered in all aspects only as illustrative and not restrictive, and the scope of the invention, therefore, is indicated by the claims rather than by the foregoing description. All changes which come within the meaning and range of equivalency of the claims are to be embraced within their scope.

What is claimed is:

1. A hard candy composition, comprising:
   a) a bulking sweetener agent, consisting of isomaltulose, erythritol or combinations thereof; and
   b) a doctoring agent, consisting of inulin;
   wherein the bulking sweetener agent to doctoring agent ratio is 70/30 to 40/60 dry solids wt. %.

2. The hard candy composition of claim 1, wherein the hard candy comprises at least 95 wt. % combined bulking sweetener agent and doctoring agent, and not more than 5 wt. % water.

3. The hard candy composition of claim 1, wherein the bulking sweetener agent is isomaltulose, and the inulin is selected from the group consisting of branched inulin and linear inulin.

4. The hard candy composition of claim 1, wherein the bulking sweetener agent is erythritol, and the inulin is selected from the group consisting of branched inulin and linear inulin.

5. The hard candy composition of claim 1, wherein the bulking sweetener agent is erythritol.

6. The hard candy composition of claim 1, wherein the doctoring agent is branched inulin.

7. The hard candy composition of claim 1, wherein the doctoring agent is linear inulin.

8. The hard candy composition of claim 1, further comprising an additional ingredient selected from the group consisting of a high intensity sweetener, flavor, citric acid, and combinations thereof.

9. The hard candy composition of claim 1, wherein the hard candy composition is clear and storage stable.

10. A hard candy composition, consisting essentially of:
    a) a bulking sweetener agent, consisting of isomaltulose, erythritol or combinations thereof; and
    b) a doctoring agent, consisting of inulin;
    wherein the bulking sweetener agent to doctoring agent ratio is 70/30 to 40/60 dry solids wt. %.

\* \* \* \* \*